May 29, 1951 L. J. BOBB 2,555,110

MAGNETIC HEAD ASSEMBLY

Filed Oct. 3, 1947 2 Sheets-Sheet 1

INVENTOR
Lloyd J. Bobb
BY
Synnestvedt & Lechner
ATTORNEYS

INVENTOR
Lloyd J. Bobb
BY
Synnestvedt & Lechner
ATTORNEYS

Patented May 29, 1951

2,555,110

UNITED STATES PATENT OFFICE 2,555,110

MAGNETIC HEAD ASSEMBLY

Lloyd J. Bobb, Glenside, Pa., assignor to The International Electronics Company, Philadelphia, Pa., a corporation of Pennsylvania Application October 3, 1947, Serial No. 777,677

6 Claims. (Cl. 179—100.2)

This invention relates to electromagnets and specifically has to do with electromagnets adapted to be used as recording and reproducing heads in magnetic recording systems.

The present invention relates to magnetic recording systems of the type in which a magnetic recording medium is translated in close proximity to a pair of magnetic pole pieces which are separated by a small flux gap. In recording heads of this general type, the magnetic flux flows through a core and along the pole pieces until it reaches the flux gap. Since the permeability of the pole pieces is much greater than that of the medium, the magnetic flux is confined to the pole pieces. However, the gap has lower permeability than the medium, with the result that the flux leaves one pole piece and flows through the recording medium for a short distance and then returns to the other pole piece.

The present invention, therefore, relates to a magnetic recording head of the type which includes a pair of pole pieces separated by a narrow flux gap.

A general object of the present invention is a magnetic recording head capable of propagating concentrated magnetic fields in a magnetic recording medium.

A more specific object of the invention is a magnetic recording head of the type described, which is adapted to mass production and assembly.

Still further, the invention contemplates a magnetic recording head which is adapted to mass production from a minimum number of relatively simple parts.

Another object of the invention is to provide a magnetic recording head assembled from pairs of identical elements having complementary interengaging parts.

In addition, the invention contemplates the assembly of magnetic recording heads of different electrical and magnetic properties from the same elements.

Another object of the invention is the provision of a lamina element for a magnetic recording head adapted to receive a prewound coil.

A further object of the invention is to provide a recording head which is symmetrical about a plane containing the flux gap and perpendicular to the record track.

How the foregoing and other objects are attained will be understood more clearly from the description and the drawings, in which.

All of the figures are drawn to an enlarged scale, the actual sizes of the parts being about one-fourth the size depicted.

According to the invention, the head is assembled from identical pairs of elements, each head comprising a pair of identical shield members 10, a pair of identical shell members 11, a pair of identical coils 12 and an even number of identical laminae 13.

Figure 3:
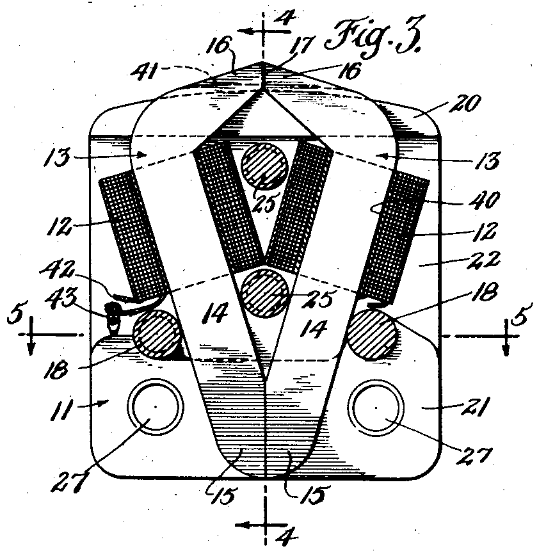
Figure 3 is a sectional view taken along the line 3—3 in Figure 4.

Each lamina 13, as may most clearly be seen in Figure 3, is of approximately L-shape when viewed in plan, and comprises at least one leg 14 whose sides are substantially parallel to permit a prewound coil such as 12 to be slid onto the lamina as a step in the assembly of the recording head.

The leg 14 makes an acute angle with the plane of the flux gap, desirably less than about 45°. When the leg is disposed at such an angle, it comprises at least half and preferably considerably more than half of the length of the lamina, thus permitting the coil to be located substantially in the mid-portion of the lamina member 13.

In the embodiment illustrated in Figure 3, both end surfaces of each lamina are defined by the plane of the flux gap, namely, the plane 4—4 of Figure 3. Thus, when two laminae are brought together with their ends 15 engaging, a tight butt-joint is made possible. It will be noted that because of the acute angle between the leg 14 and the plane 4—4, the butt-joint between the ends 15 is of much greater length than the normal width of the leg. When the included angle is substantally less than 45°, as is illustrated in Figure 3, the length of the joint approaches twice the width of the leg 14 measured along a line normal to the axis of the leg. This great length reduces the attenuating effect of the joint upon the flux flowing in the core.

As will appear more fully hereinbelow, it is contemplated that magnetic recording heads of varying magnetic and electrical properties may be assembled from the same basic elements. For example, the magnetic properties may be varied by increasing the number of laminae. Thus, while in Figure 4 I have illustrated a lamination comprising a two-layer stack of laminae, it will be understood that the invention also contemplates the use of one layer, or of three or more layers.

Similarly, the inductance of the head may be varied by increasing or decreasing the number of turns, spacing, wire size, and the like of the coils 12, so long as the external dimensions of the coils may be accommodated within the head structure.

Having described the laminae and coils, I now turn to the means by which these elements are maintained in proper relationship to one another.

Each head, as has been pointed out, includes, in addition to the lamination and coils, a pair of identical shell members 11. The shells 11 are provided with complementary interengaging parts, including, on each shell, a pin 18 and an aperture 19. While the shell members are identical, it will be seen that when a pair of shells are turned face to face, the pin of one member will be aligned with the bore of the other member, and since there are in each pair two pins separated by a considerable distance, the shells will be held in accurate registration with one another, with freedom, however, for movement toward and away from one another. While the top and bottom portions 20 and 21 of each shell are plane surfaces adapted to abutting contact when the shells are assembled, the central portion 22 is cut out to form a recess which accommodates the coils 12 in the assembled recording head.

I have provided, through the central portion of each shell, a pair of bores 23. While bolts passing through bores 23 may be employed to maintain the shells in assembled relationship, I prefer to employ screws for this purpose. While the shells, as has been stated above, are identical, one operation is performed on the shells which differentiates the two members of the pairs. The results of this operation may be seen in Figure 4, in which the ends of the bores 23 in the left-hand shell member have been counter-sunk as at 24 to receive the heads of screws 25 and the opposite ends of the bores, that is, the ends in the right hand shell member 11, have been tapped to receive screws as at 26.

To complete the description of the shell members 11, it should be pointed out that the bottom portion of each shell is pierced by a pair of apertures 27. When the shell is assembled, these apertures are in alignment and may be employed to receive bolts or rivets for mounting the heads in the magnetic recording apparatus.

Figure 1:
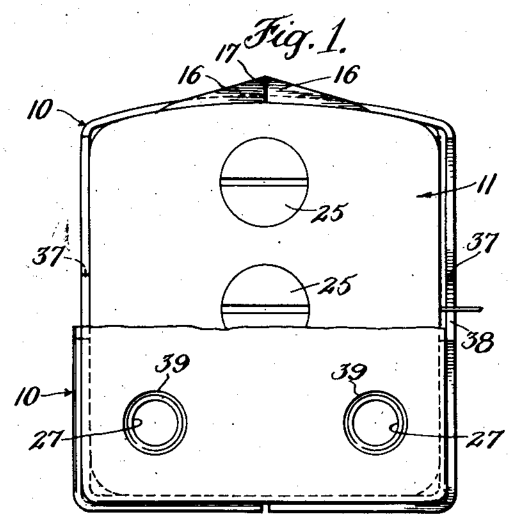
Figure 1 is an elevation of a magnetic recording head constructed in accordance with the invention with a portion of the external shield broken away.
Figure 2:
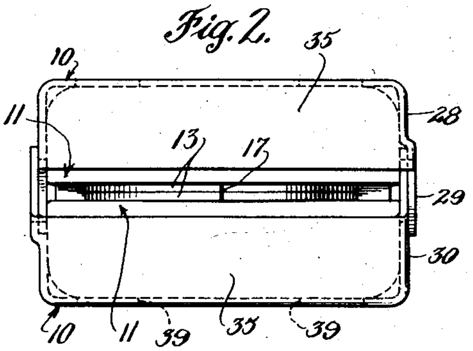
Figure 2 is a top view of the recording head of Figure 1.
Figures 7, 8:
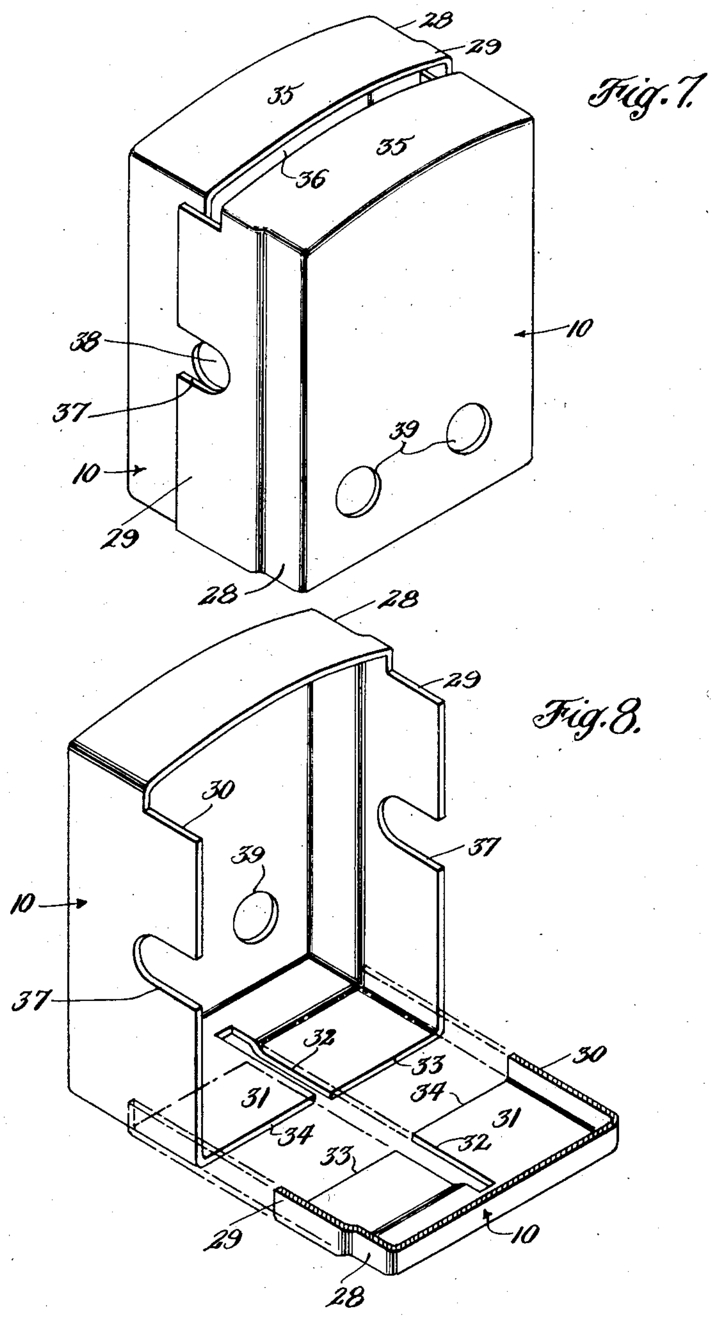
Figure 7 is an isometric view of a pair of complementary shield members in assembled relationship.
Figure 8 is an isometric view of one of the shield members illustrated in Figure 7 together with a broken view of the second shield member and illustrating the method of assembling the external shield of the magnetic recording head.

Turning now to the shield members, which are most clearly illustrated in Figures 2, 7 and 8, it will be seen that each head is enclosed by a shield comprising two identical complementary members 10. The shield members 10 are advantageously fabricated from ferrous material, for example, iron or soft steel, to shield the head from the influence of extraneous magnetic fields. Alternatively, it will be understood that the advantages arising out of the design of the shield members 10 may be exploited in a protective covering or case devoid of shielding properties, in which case the members may be fabricated from a non-metallic material, as, for example, a resin of the phenol formaldehyde type.

As may be seen most clearly in Figure 2, one side 28 of each shield member is provided with a lip 29 adapted to overlap the other side 30 of the opposite shield member when the shield is assembled.

As is clearly illustrated in Figure 8, the bottom 31 of each shield member is slit as at 32, and the half 33 of the bottom which is adjacent lip 29 is depressed relative to the balance of bottom 31. Thus, two shield members may be assembled as is indicated by the dotted lines in Figure 8, with each lip 29 overlapping a side 30 and each depressed bottom portion 33 engaging the outside of an undepressed bottom portion 34. As may be best seen in Figure 7, the top portions 35 of the shield members 10 lie in spaced edge-to-edge relation to one another when the shield is assembled, providing a gap 36. As will be more clearly understood from the description (contained hereinbelow) of the assembly of a magnetic recording head constructed in accordance with the invention, the gap 36 between top portions 35 is controlled by the thickness of the lamination employed in the particular assembly, since the shield members 10 are mounted directly on shell members 11. According to the invention, the width of the top portions 35 is such that the gap 36 is always somewhat wider than the lamination clamped between the shell members 11.

Each shield member 10 is provided with a pair of slots 37, which, when the head is assembled, provide openings such as 38 through which connecting leads may be passed.

Finally, each shield member is pierced by a pair of holes 39, which, when the head is assembled, are in alignment with the holes 27 in shell members 11, and thus provide for the passage therethrough of bolts, rivets or screws, which serve both to mount the head and to retain the shield members 10 in position.

As was briefly mentioned above, it is contemplated that from the standardized parts, i. e., the laminae, shell members and shield members, magnetic recording heads of different properties may be assembled.

The electrical properties of the recording head are determined principally by the amount of material in the core and by the way in which the coils 12 are wound. The amount of material in the core may be controlled by varying the number of laminae employed; and since both the shell members 11 and shield members 10 are capable of sliding adjustment toward one another, the same shield and shell members may be used in heads employing any number of layers, so long as the thickness of the lamination is not so great as to prevent the interengagement of the pins 18 and holes 19 of the shell members and of lips 29 and sides 30 of the shield members.

Similarly, the characteristics of the coils may be varied within wide limits by controlling the number of turns, size of wire, spacing of turns, and so on, so long as the internal dimensions of the form are great enough to permit the coil to be slipped over leg 14 of a lamina or laminae and so long as the external dimensions are small enough to be accommodated within the recessed portion 22 of the shell members.

Figure 4:
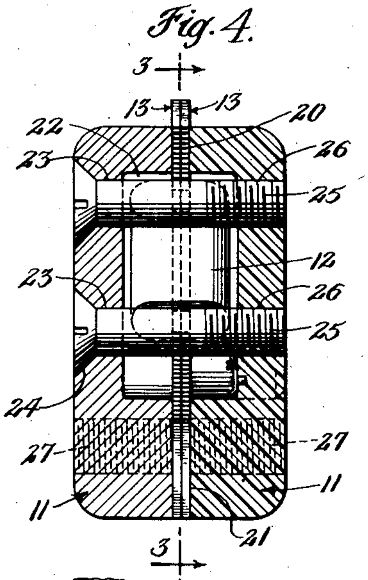
Figure 4 is a sectional view taken along the line 4—4 in Figure 3.
Figure 5:
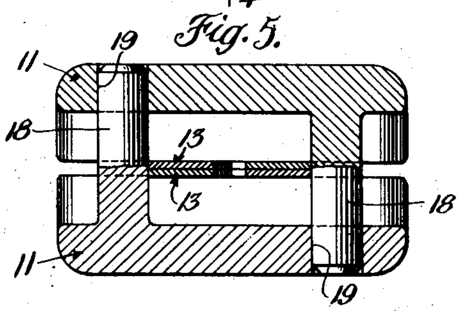
Figure 5 is a sectional view taken along the line 5—5 of Figure 3.
Figure 6:
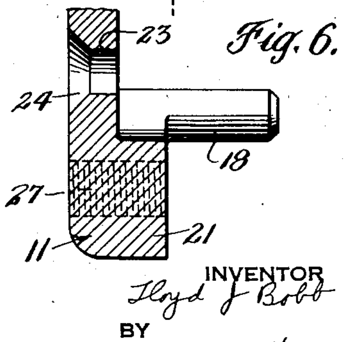
Figure 6 is a section of a portion of a shell member constructed in accordance with the invention.

The thickness of the laminations and the characteristics of the coils having been selected, a recording head is assembled in the following manner: first, the coils are separately wound on forms which may take the shape of a cylindrical bushing 40 of insulating material such as paper. These coils are then slipped over the legs 14 of the laminae 13. If a lamination of more than one layer is desired, the coils will be simultaneously slipped over the desired number of laminae 13, for example two, as illustrated in Figure 4.

A pair of shell members 11 is then selected, in one of which the bores 23 have been tapped and in the other of which the bores 23 have been countersunk. The two halves of the lamination, each bearing its coil, are then placed in position on one of the shell members with the legs 14 between the pin 18 and the hole 19, as illustrated in Figure 3. The other shell member 11 is then inverted over the first, with its pin and hole 18 and 19 presented to the complementary members on the first shell. Screws 25 are now introduced into the apertures 23 and given a few turns to start the screws into threads 26. A spacer member 17, which may take the form of a piece of aluminum foil, is inserted between the ends 16 of the laminae 13. Pressure is now applied to both of the ends 16 in a direction toward the ends 15 of the laminae 13, thus forcing the adjacent legs 14 of the laminae between the two pins 18. While still maintaining this pressure, the screws 25 are tightened, thus clamping the laminae in their wedged position at both ends, that is, the ends 16 of the laminae are clamped between the portions 20 of the shell members and the ends 15 of the laminae are clamped between the portions 21 of the shell members.

At this stage of the assembly, the ends 16 of the laminae 13 are ground down to the dotted line 41 (Figure 3) to form a pair of polished pole pieces. Since the pole pieces are formed of such harder material than the spacer 17, the spacer will also be ground down and the operation will result in a smooth, continuous surface comprising the pole pieces 16 and the spacer 17.

The head is now placed in a shield member 10, with the connecting leads 42 lying in one or both of the slots 37. A second shield member 10 is then inverted over the first and slid into snug engagement with the head. Suitable securing members, such as bolts or screws, are then inserted through the apertures 39 of the shield members and 27 of the shell members, and the head mounted in the magnetic recording apparatus.

As may be seen from Figures 2 and 7, respectively, the width of the top surface 35 and the depth of the slot 37 in the external shield members 10 are such that whatever the thickness of the lamination clamped between shell members 11, the top surface 35 forms a gap 36 which clears the pole pieces 16, and the slots 37 leave sufficient space for the passage of connecting leads 42.

It will be apparent, therefore, that the lamina of the present invention presents certain advantages arising solely out of the plan form thereof. For example, the L-shaped lamina of the present invention is markedly superior to the C-shaped lamina of the prior art in that the C-shaped lamina makes it necessary to wind the coil on the lamina, whereas the L-shape of the lamina of the present invention permits the assembly of a head from prewound coils. It will be understood, of course, that this advantage accrues where the width of the principal leg of the lamina, when measured along a line normal to the axis of the leg, is nowhere greater than the internal diameter of the coil with which it is to be used. However, it should be noted that full advantage of the L-shape is not realized unless at least the end of one leg of the lamina is so oriented relative to the axis of that leg that two such laminae may be placed with the said ends in opposition to one another to form a flux path which is symmetrical about the common plane of the end surfaces.

Thus, the complete lamination is four-legged and four-cornered in plan form, with a flux gap at one of the corners, and is adapted to carry coils on two adjacent legs.

Although the laminae 13 may be fabricated from any material having the requisite properties of high magnetic permeability and low magnetic retentivity, I prefer to employ for this purpose a material such as molybdenum Permalloy. The laminae are stamped from the sheet material and are thereafter preferably hydrogen annealed. While it may be desirable to grind the abutting surfaces of the laminae in order to insure a good fit, I have found that with proper stamping technique, a sufficiently accurate surface may be obtained.

Shell members 11 may be formed either of metal or of non-conducting material. I have found, for example, that in some applications, shell members which have been die-cast from aluminum or zinc are satisfactory. On the other hand, it is sometimes desirable to form these members from insulating material, for example, synthetic resins such as phenol formaldehyde.

The selection of metal or non-metallic material for the shell members depends upon the application for which the heads are intended. For example, in some cases, where extraneous electromagnetic fields are no problem, the external shield may be dispensed with, in which case it is desirable to employ metallic shell members of non-magnetic metal to provide electrostatic shielding.

On the other hand, when the shield members are to be used in any case for electromagnetic shielding, it is often desirable to use insulating material for shell members 11. Finally, in some applications, I have found it to be advantageous to use one metallic shell member and one non-metallic shell member.

When at least one non-metallic shell member is employed, it may be desirable to bring the connections out through the side of the shell member or, alternatively, to provide a lug embedded in or secured to the shell member to which external connections may be made. For example, I have indicated at 43 in Figures 3 and 4, a metallic lug embedded in the shell member 11, to which a coil lead 42 may be connected as by soldering, and to whose other end an external lead may be connected.

The spacer between the pole pieces may be made of any non-magnetic material, although I prefer to use aluminum sheet whose thickness is in the neighborhood of .5 to 1 mil in thickness. The thicknes is determined by the frequency response desired. As is well known in the art, the response characteristics of a magnetic recording head are in part determined by the relationship between the dimensions of the flux gap and the physical wave length of the magnetic record.

The electrical characteristics of the coils 12 may vary within wide limits, depending upon the electrical characteristics of the other equipment with which the head is to be associated. I have employed, in heads made in accordance with the present invention, coils having from 30 to 1000 turns per leg, employing wire whose size varied between #30 and #50. For a typical high impedance head, I employ two coils of about 2000 turns each of #42 wire, with six layers of lamination. A head of this construction has an impedance of 7500 ohms at 100 cycles.

A typical low impedance head made in accordance with the invention included two coils of 300 turns each of #34 wire, and two layers of lamination incorporating a flux gap ½mil in width. This head had an impedance of 50 ohms at 1000 cycles.

I claim:

1. A magnetic head comprising two similar core members separated by a pair of flux gaps lying in a common plane, a confronting pair of ends of said members separated by one of said gaps being formed to accommodate a surface of a traveling magnetic recording medium traversing said gap in a path intersecting said plane, and a coil having an axial bore mounted in surrounding relation to one of said members in a location intermediate the ends, the central portion and one end portion of said member being defined by surfaces lying within the path swept by the bore of the coil when the axis of the latter is shifted along the axis of the member from said one end to its mounted location.

2. A magnetic head in accordance with claim 1 in which the central and end portions of said member are defined by generally parallel sides.

3. A magnetic head in accordance with claim 2 in which said member is generally L-shaped and in which said central and end portions together comprise the longer leg of the L.

4. A magnetic head in accordance with claim 3 in which said longer leg is disposed at an acute angle with respect to the said plane.

5. A magnetic head in accordance with claim 4 in which the angle between said plane and said longer leg is less than 45°.

6. A magnetic head in accordance with claim 1 in which the central and end portions of said member are defined by generally parallel sides, in which said member is generally L-shaped, in which said central and end portions together comprise the longer leg of the L, and in which the gap between the ends of the shorter legs is a translating gap, and the gap between the longer legs is of lower reluctance than said first gap.

LLOYD J. BOBB.

REFERENCES CITED

The following references are of record in the file of this patent:

UNITED STATES PATENTS

| Number | Name | Date |
|---|---|---|
| 2,144,844 | Hickman | Jan. 24, 1939 |
| 2,202,139 | Buhrendorf | May 28, 1940 |
| 2,229,326 | Hiller | Jan. 21, 1941 |
| 2,233,621 | Lovell | Mar. 4, 1941 |
| 2,263,485 | Clopton | Nov. 18, 1941 |
| 2,351,003 | Camras | June 13, 1944 |
| 2,413,108 | Latchford | Dec. 24, 1946 |
| 2,488,717 | Eilenberger | Nov. 22, 1949 |

FOREIGN PATENTS

| Number | Country | Date |
|---|---|---|
| 403,671 | Great Britain | 1934 |

OTHER REFERENCES

Akustiche Zeitschrift, Nov. 1937, p. 281.